United States Patent
Gaertner et al.

(10) Patent No.: US 7,401,185 B2
(45) Date of Patent: Jul. 15, 2008

(54) BUFFERED INDEXING TO MANAGE HIERARCHICAL TABLES

(75) Inventors: Ute Gaertner, Baden-Wurttemberg (DE); Erwin F. Pfeffer, Holzgerlingen (DE); Bruce Wagar, Tempe, AZ (US)

(73) Assignee: International Business Machines Corporation, Armonk, NY (US)

(*) Notice: Subject to any disclaimer, the term of this patent is extended or adjusted under 35 U.S.C. 154(b) by 258 days.

(21) Appl. No.: 11/428,858

(22) Filed: Jul. 6, 2006

(65) Prior Publication Data

US 2008/0010407 A1 Jan. 10, 2008

(51) Int. Cl.
*G06F 12/08* (2006.01)
(52) U.S. Cl. .................. 711/122; 711/141; 711/144
(58) Field of Classification Search ............ None
See application file for complete search history.

(56) References Cited

U.S. PATENT DOCUMENTS

| | | | |
|---|---|---|---|
| 5,966,735 A | 10/1999 | Noel et al. | |
| 6,035,326 A | 3/2000 | Miles et al. | |
| 6,425,762 B1 | 7/2002 | Ernst | |
| 6,760,732 B2 | 7/2004 | Busshart et al. | |
| 6,826,726 B2 | 11/2004 | Hsing et al. | |
| 6,877,089 B2 | 4/2005 | Sinharoy | |
| 6,956,848 B1 | 10/2005 | Keung et al. | |
| 7,197,601 B2 * | 3/2007 | Slegel et al. ............ 711/133 |
| 7,281,115 B2 * | 10/2007 | Siegel et al. ............ 711/206 |
| 7,284,100 B2 * | 10/2007 | Slegel et al. ............ 711/156 |
| 2002/0124133 A1 | 9/2002 | Duruoz | |
| 2004/0230749 A1 * | 11/2004 | Slegel et al. ............ 711/144 |
| 2005/0268045 A1 * | 12/2005 | Slegel et al. ............ 711/133 |
| 2005/0273561 A1 * | 12/2005 | Slegel et al. ............ 711/133 |
| 2007/0186075 A1 * | 8/2007 | Slegel et al. ............ 711/207 |

FOREIGN PATENT DOCUMENTS

JP    56101684    8/1981

\* cited by examiner

*Primary Examiner*—Kevin Verbrugge
(74) *Attorney, Agent, or Firm*—Lynn L. Augspurger

(57) ABSTRACT

Buffered indexing for a computer's array such as a cache is used to synchronize parent entries with children and allow background invalidation (that is, suspending the invalidation should a new request of the array come in, resuming the invalidation after the request is satisfied) of the child entries. A method for synchronization uses linking of (multiple) entries in lower-level tables to single entries in a higher-level table with a buffered index value. This index value increments each time the higher-level entry is replaced or invalidated (and thus disassociated with its corresponding lower-level entries). Multiple sets of index values are maintained, so that when one set is exhausted, processing can continue with one of the other sets. All corresponding lower-level entries with index values from the old (dirty) set can then be scrubbed (invalidated) while new entries are built from the new (clean) set. Scrubbing can take place in the background, and can be suspended and resumed at any time so as to not impact request service times of the tables.

20 Claims, 5 Drawing Sheets

| Entry | State | Index | Valid |
|---|---|---|---|
| A | 0 | 0 00 | 0 |
| B | 1 | 0 01 | 1 |
| C | 0 | 1 00 | 1 |
| D | 1 | 1 11 | 0 |

H

| Entry | Index | Valid | Parent |
|---|---|---|---|
| a | 0 01 | 0 | B |
| b | 0 00 | 1 | A |
| c | 0 01 | 1 | A |
| d | 0 00 | 1 | C |
| e | 1 01 | 1 | C |
| f | 1 00 | 1 | C |
| g | 0 10 | 1 | D |
| h | 1 01 | 1 | B |

L

| Entry | Index | Valid |
|---|---|---|
| A | 00 | 0 |
| B | 01 | 1 |
| C | 00 | 1 |
| D | 10 | 0 |

H

| Entry | Index | Valid | Parent |
|---|---|---|---|
| a | 00 | 0 | A |
| b | 00 | 1 | C |
| c | 00 | 1 | B |
| d | 01 | 1 | B |
| e | 00 | 1 | B |
| f | 00 | 1 | A |
| g | 10 | 1 | D |
| h | 01 | 1 | B |

| Entry | Set | Index | Valid |
|-------|-----|-------|-------|
| A | 0 | 00 | 0 |
| B | 0 | 01 | 1 |
| C | 1 | 00 | 1 |
| D | 0 | 10 | 0 |

H

| Entry | Set | Index | Valid | Parent |
|-------|-----|-------|-------|--------|
| a | 0 | 01 | 0 | B |
| b | 0 | 00 | 1 | A |
| c | 0 | 01 | 1 | A |
| d | 0 | 00 | 1 | C |
| e | 1 | 01 | 1 | C |
| f | 1 | 00 | 1 | C |
| g | 0 | 10 | 1 | D |
| h | 0 | 01 | 1 | B |

| Entry | State | Index | Valid |
|---|---|---|---|
| A | 0 | 0 00 | 0 |
| B | 1 | 0 01 | 1 |
| C | 0 | 1 00 | 1 |
| D | 1 | 1 11 | 0 |

H

| Entry | Index | Valid | Parent |
|---|---|---|---|
| a | 0 01 | 0 | B |
| b | 0 00 | 1 | A |
| c | 0 01 | 1 | A |
| d | 0 00 | 1 | C |
| e | 1 01 | 1 | C |
| f | 1 00 | 1 | C |
| g | 0 10 | 1 | D |
| h | 1 01 | 1 | B |

BUFFERED INDEXING TO MANAGE
// HIERARCHICAL TABLES

TRADEMARKS

IBM® is a registered trademark of International Business Machines Corporation, Armonk, N.Y., U.S.A. Other names used herein may be registered trademarks, trademarks or product names of International Business Machines Corporation or other companies.

FIELD AND BACKGROUND OF THE INVENTION

1. Field of the Invention

This invention relates to computer design, and particularly to a hierarchical organization of arrays in a computer allowing creation of translation caches permitting maintaining the coherency of the entries in hierarchical computer tables without impacting service time of requests of the tables or requiring excessive space or logic.

2. Background of the Invention

In computers, the design of dynamic high-speed access tables (arrays), such as translation caches, can often be enhanced through a hierarchical (multi-level) organization, as opposed to a flat (single-level) organization. A multi-level scheme features entries that are associated with a particular level, perhaps in different tables, with each lower-level entry associated with a particular higher-level entry. The intent of the higher-level (parent) entries is that they share information common to all of their corresponding lower-level (child) entries. This not only saves space (chip area is probably the most important component of microprocessor design), it allows many common functions to be performed on a single parent entry instead of numerous child entries, which can improve performance and simplify the design.

SUMMARY OF THE INVENTION

The shortcomings of the prior art are overcome and additional advantages are provided through the provision of a hierarchical organization which is useful in IBM computers and other computer systems having cache entries where the system can maintain coherency of the entries in the hierarchical tables. Multiple entries are linked in lower level tables to single entries in a higher level table with a buffered index such that having higher-level (parent) entries can share information common to all of their corresponding lower-level (child) entries. The index value increments each time a hierarchy-level entry is replaced or invalidated. Multiple sets of index values are maintained so that when one is exhausted, processing can continue with another one of the sets. The index management provides that lower level entries have index values including and index set management types, specifically a Current, a Dirty and a Clean index set. The uses of these index sets allows corresponding lower level entries with index values from an old dirty set to be scrubbed/invalidated while new entries are built from a new set.

Thus it will be sent that we have developed a cache design with a hierarchical organization using buffered indexing to synchronize parent entries with children and allow background invalidation (that is, suspending the invalidation should a new request of the array come in, resuming the invalidation after the request is satisfied) of the child entries. The cache is simple, space-efficient, and extensible to a variety of situations. The cache uses linking of (multiple) entries in the lower-level tables to single entries in a higher-level table with a buffered index value. This index value increments each time the higher-level entry is replaced or invalidated (and thus disassociated with its corresponding lower-level entries). Multiple sets of index values are maintained, including the current, dirty and clean index sets, so that when one set is exhausted, processing can continue with one of the other sets. All corresponding lower-level entries with index values from the old (dirty) set can then be scrubbed (invalidated) while new entries are built from the new (clean) set. Scrubbing prevents the coherency risks of associating old entries in the lower-level tables with new entries in the higher-level tables. This scrubbing can take place in the background (that is, between handling requests of the tables), and can be suspended and resumed at any time so as to not impact request service times of the tables.

This method of maintaining the coherency of entries has the advantage that it takes only a few bits per entry to implement, and it can be expanded as necessary to meet the particular characteristics of the tables in use.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

An example of a background function that can be performed on a parent entry in a table is invalidation. Without the invention, every child entry associated with the parent is invalidated as well. The process of invalidating these children might be cumbersome, such as exhaustively searching every entry of an array in the foreground (that is, deferring all new requests of the array until the invalidation is complete), or require special hardware (such as CAM arrays) that is expensive in complexity or chip area to accomplish, or require significant space and associated logic for structures like doubly-linked lists to maintain child entries associated with the same parent.

This invention solves the problem of maintaining the coherency of the entries in hierarchical computer tables without impacting service time of requests of the tables or requiring excessive space or logic. Existing solutions are either very expensive in silicon chip area or power (such as CAM arrays) or are unnecessarily complex (such as doubly-linked lists).

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates a computer system having our hierarchical tables, while

FIG. 2 illustrates our indexing design showing H and L of FIG. 1 expanded to contain a two-bit index field for each entry.

FIG. 3 illustrates a new index set field which has been added and which functions as additional high-order bits of the index field.

FIG. 4 illustrates a one-index-set-bit implementation, where the index set bit has been incorporated into the index field as the high-order bit and where the high order H has two dirty index sets, one for B and one for D.

The detailed description explains the preferred embodiments of the invention, together with advantages and features, by way of example with reference to the drawings.

DETAILED DESCRIPTION OF THE INVENTION

Figure 1A:
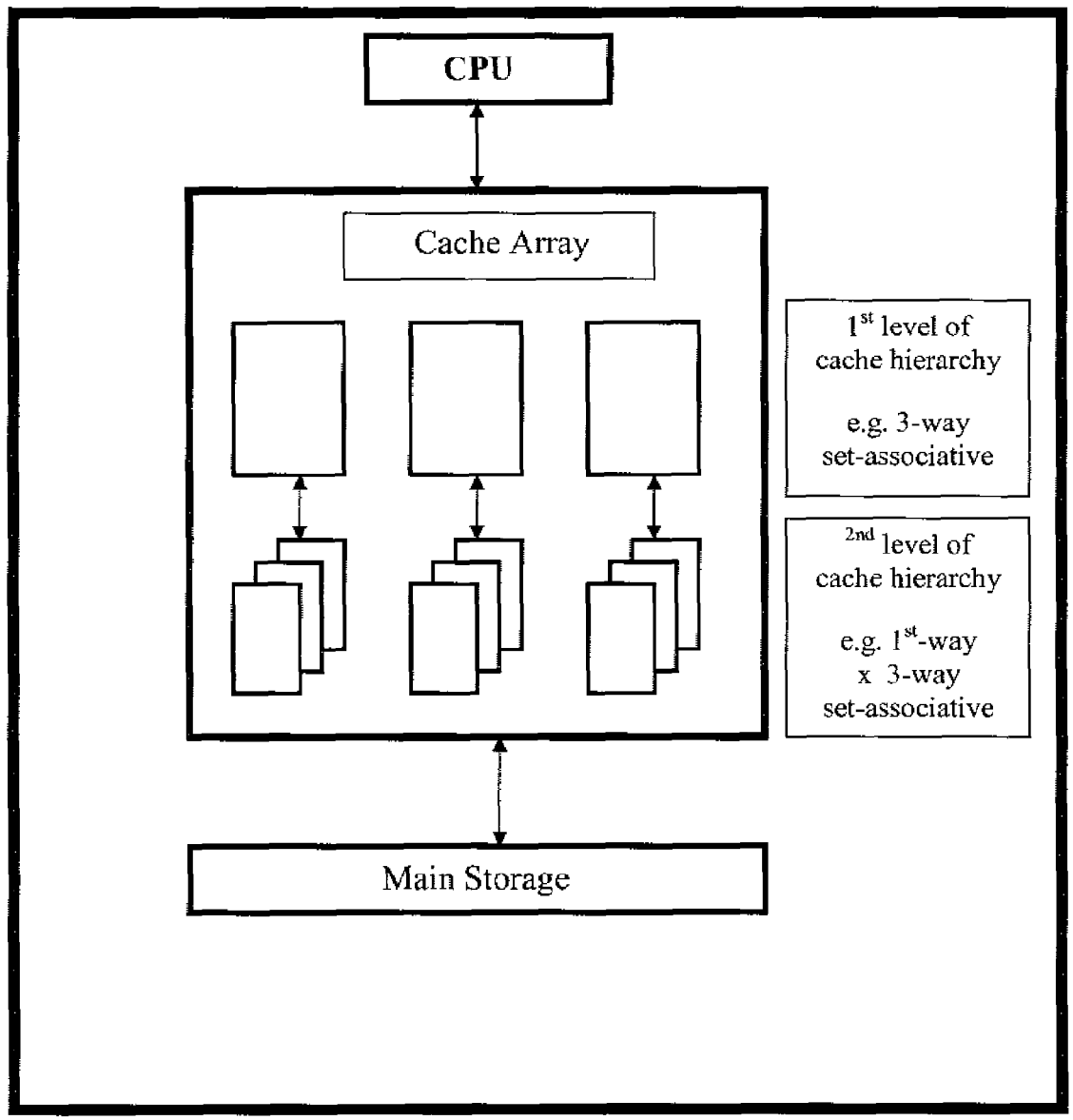

Turning now to the drawings in greater detail, it will be seen that as shown in FIG. 1A a computer system which has a storage system and microprocessors, often including a cache array can be organized with an array of hierarchy storage elements containing hierarchical tables of entries of values. Here there is, for simplification, we'll assume two tables, H and L, with H consisting of high-level entries and L consisting of low-level entries. In reality, we could be dealing with more levels, or more tables, or even one table (and all the entries sharing it). Each (valid) entry in L points to an entry in H (namely, its parent). For the hierarchical scheme to be of much value, it could be assumed further that multiple children in L can point to the same parent in H. Looking up an entry in L, then, frequently consists of looking up its corresponding parent in H. Part of this might be to obtain information common to all children in L that share the same parent in H, but more importantly, an entry in L may no longer be valid if its corresponding parent is not valid. See FIG. 1 for an example of H and L.

Figure 1B:
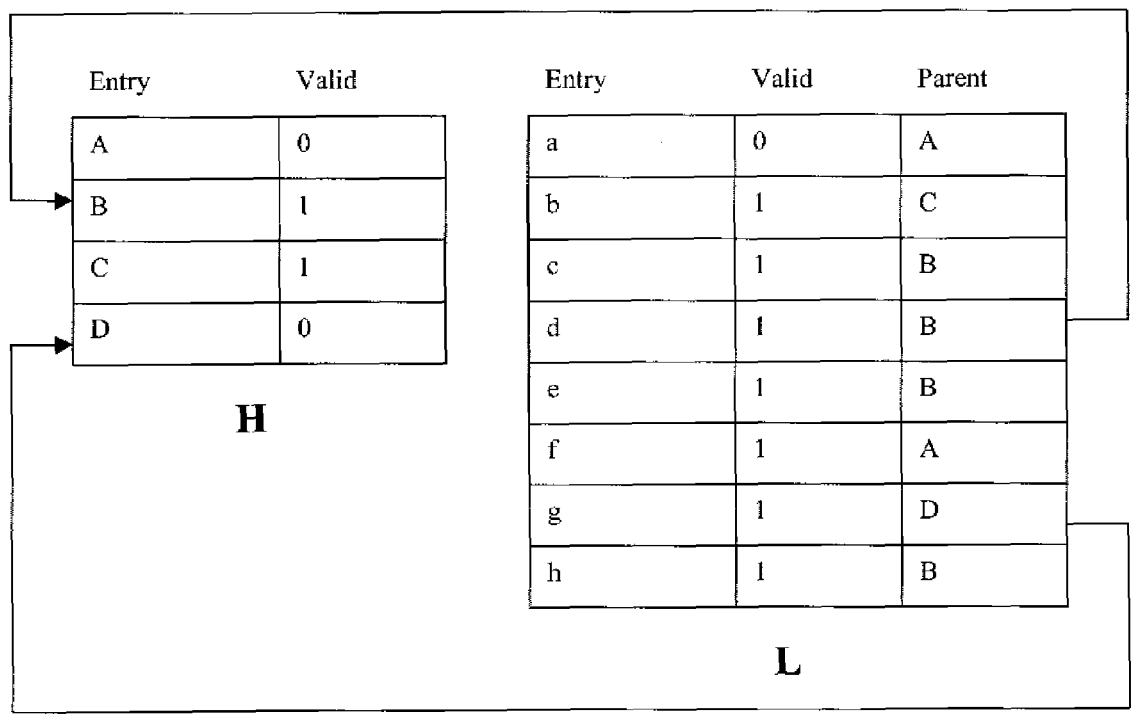
FIG. 1B illustrates one example of hierarchical tables, one of high level H and another of low level L of the computer cache array in the FIG. 1A computer having a translation cache with a hierarchical table design.

In FIG. 1B, H contains four entries, A through D, while L contains eight entries, a through h. Each entry contains a valid bit (1 means valid, 0 means invalid). Each entry in L points to a parent entry in H. For instance, d points to B and g points to D (as shown). Entries in H are valid if they have their valid bit set (in this case, B and C are valid). Entries in L are valid if both of the following conditions are met: (i) they have their valid bit set and (ii) they point to a valid entry in H. For example, a is invalid (does not have its valid bit set), as is g (has its valid bit set, but points to D, which is not valid), but d is valid (since its valid bit is set, and it points to B, which is valid).

An entry O in H can become invalid for voluntary (direct action of hardware or software) or involuntary (aging out due to inactivity) reasons. One side effect is that its corresponding children in L become invalid since they no longer point to a valid entry in H. If, however, O is replaced with a new valid entry, N, you have the problem that all of O's children now point to N, which is not their parent. Rather than manually going through and invalidating all of O's corresponding children in L (a process we call scrubbing), a straightforward index scheme can be employed, where a certain number of index bits, say I, are added to each entry in H and L. These index bits can encode $2^I$ number of distinct values. Each entry in H can start its index at 0, and increment to $2^I-1$ as a new entry overwrites the old one. Corresponding child entries in L would have their indices set to the same value, so that these children could be validated by comparing their indices to the index of their parent in H, making sure these indices are set to the same value. FIG. 2 demonstrates this indexing scheme.

In FIG. 2, H and L are expanded to contain a two-bit index field for each entry. When an entry is installed in L, its index value is set to that of its parent in H. When a parent entry is replaced in H, its corresponding index is incremented so that children in L which still point to it no longer have matching indices. This adds a third criterion for validity of entries in L: (iii) their index value is equal to that of their parent entry in H.

For example, c is no longer a valid entry, for while it has its valid bit set, and it points to a valid entry in H, its index differs from that of its parent's. On the other hand, d is still valid, for its index value is the same as that of its parent, B.

There is nothing novel about indices to enforce synchronization. The one significant implementation detail is the coherency complications that arise when all possible index values are cycled through. This introduces the risk of a new entry in H being associated with old entries in L that share the same index value (that is, the index for the parent entry completely cycled around while there were still old children from a previous parent still pointing to it). Actually, this is the same phenomenon we faced every time an entry in H was invalidated and there were no index fields. An index merely decreases the frequency of needed scrubbing.

Indices introduce a basic time-versus-space performance tradeoff. In order to be efficient (entry-size-wise), I (the number of index bits) needs to be as small as possible. And in order to be efficient (overhead-wise), I needs to be as large as possible, to minimize scrubbing. Generally speaking, dynamic arrays (like caches) need to be as large as possible (entry-wise) in order to improve the chances of finding recent data in them, but they need to be as small as possible (size-wise) to improve the access time to find an entry. Both of these objectives are met by minimizing 1, so the main optimization concern is the scrubbing overhead.

Without loss of generality, we will assume, for each slot in H, the index bits form an unsigned binary number, starting at 0, incrementing by one up to $2^I-1$, and then back to 0, every time a new entry is installed in that particular slot (i.e., replaces an existing entry with index value one less). In order to handle the coherency risk when the indices wrap back to 0, we propose a buffered index approach (that is, maintaining multiple sets of index values). See FIG. 3, where a new field has been added (the index set), which works for all intents and purposes as additional high-order bits of the index field. That is, when an index field wraps, the corresponding index set field is incremented. Also, a fourth criterion is added for validity of entries in L: (iv) their index set is equal to that of their parent in H. For instance, in FIG. 3, d is not valid (different index set than its parent C), e is not valid (different index than C), but f is valid (index set and index equal to those of C).

The last detail to attend to is the index set management. There are three types of index sets:

1. Current—the current index set is the one currently being used by the entry in H.

2. Dirty—a dirty index set is one that is not in use and may have associated with it entries in L that have their valid bits set.

3. Clean a clean index set is one that is not in use and does not have associated with it any entries in L that have their valid bits set.

All index sets start out clean, with one being identified as the current set. Once the current set is exhausted, it becomes dirty and indexing resumes with a clean set becoming the next current set. While not in use, the dirty sets can be scrubbed, thus converting them to clean sets. As long as this scrubbing takes place while the dirty sets are not needed (background scrubbing), coherency is maintained without apparent interruption to the system. If, however, the current set is exhausted, and it is necessary to switch to a new set, and all other sets are dirty, then the scrubbing cannot be delayed. This could negatively impact performance, holding up requests while the scrubbing is done (foreground scrubbing).

For the sake of simplicity, we can assume one index set bit (that is, two index sets). As mentioned before, the index field can incorporate the index set as its high-order bit for all practical purposes. We then require one additional bit per entry in H, namely the state of the other index set (i.e., the set that isn't current), 1 meaning dirty (and in need of scrubbing), 0 meaning clean (and all right to use when the current set is exhausted). In general, for implementations with more index set bits, say S, you would need S bits to keep track of the dirty index sets. For example, this new field could identify the first dirty index set, with all those index sets between this one and the current one (noninclusive) assumed to be dirty.

FIG. 4 demonstrates a one-index-set-bit implementation, where the index set bit has been incorporated into the index field as the high-order bit. Looking at H, there are two dirty index sets, one for B and one for D. While B's current index set (0) still has some valid values (namely, 10 and 11), D's has been exhausted. When D gets replaced with a new entry, it will be necessary to complete the scrubbing in L of any entry that still points to D with a dirty index set. In this case, g is just such an entry: its valid bit is one, it points to D, its index set is 0 (which is not the current index set for D), and the state of its index set is dirty. g would have to have its valid bit set to 0 before a new entry could be written for D. In contrast, new entries could be written for B, even though h points to a dirty index set of B's, for there is still room in the current index set of B. It is only necessary that h have its valid bit set to 0 before B switches index sets.

Implementation Considerations

The number of index bits, as well as the number of index set bits, is going to depend on many factors, including the frequency and efficiency of scrubbing as well as the activity rate of the table. Increasing either field by one bit doubles (on average) the amount of time needed between scrubbing, at the expense of growing both parent and child entries by one bit. In addition, increasing the index set field by one bit grows the parent entries an additional bit (to manage the dirty index sets), but allows more granularity in the scrubbing process, which can result in more efficient scrubbing.

A straightforward way to perform background scrubbing (taking our example H and L tables) is, during periods of inactivity, H is searched for entries with dirty index sets. When one is found, L is then searched for corresponding child entries with dirty index sets, and such entries are invalidated. Once L has been searched, and all appropriate child entries invalidated, the dirty index set(s) can be marked clean and the search can resume in H for more entries with dirty index sets. Any necessary activity (request of H and/or L) that comes along during this background scrubbing can suspend the scrubbing in order to honor the request without unnecessary delay, with the scrubbing resuming where it left off after the request has been honored.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of managing hierarchical tables in an array, comprising:

maintaining an array of hierarchical tables of entries of values, comprising a higher-level table and at least one lower-level table of entries, and linking multiple entries in a lower-level table to single entries in a higher-level table with a buffer having index values for said entries to maintain coherency of the entries in said hierarchical tables, said index values including a current index, a dirty index and a clean index, and incrementing an index value each time a higher-level entry is replaced or invalidated.

2. The method of claim 1 wherein multiples sets of index values are maintained, and when one set is exhausted, processing continues with one of the other of the multiple sets.

3. The method of claim 1 wherein multiple entries are linked in lower level tables to single entries in a higher level table with a buffered index such that having higher-level entries can share information common to all of their corresponding lower-level entries.

4. The method of claim 1 wherein said higher level table contains parent entries and said lower level table contains child entries, and multiple entries are linked in lower level tables to single entries in a higher level table with a buffered index such that having higher-level parent entries can share information common to all of their corresponding lower-level child entries.

5. The method of claim 1 wherein an index value increments each time a hierarchy-level entry is replaced or invalidated.

6. The method according to claim 5 wherein multiple sets of index values are maintained so that when one is exhausted, processing can continue with another one of the sets.

7. The method according to claim 6 wherein said index sets allow corresponding lower level entries with index values from an old/dirty set to be scrubbed/invalidated while new entries are built from a new set.

8. The method according to claim 7 wherein should a new request of the tables be forthcoming, the scrubbing/invalidation occurs as a background invalidation.

9. The method according to claim 4 wherein background invalidation occurs after suspending a scrubbing/invalidation of a child entry should a new request of the array be forthcoming, and wherein the scrubbing/invalidation resumes after the request is satisfied of the child entries.

10. The method according to claim 1 wherein using linking of multiple entries in the lower-level tables to single entries in a higher-level table with said index values in said buffer, said index values increment each time a higher-level entry is replaced or invalidated and disassociated with a set of index values of its corresponding lower-level entries, and when one set is exhausted, processing can continue with one of the other sets, wherein all corresponding lower-level entries with index values from an old dirty set can then be scrubbed/invalidated while new entries are built from a new clean set, said scrubbing preventing associating old entries in the lower-level tables with new entries in the higher-level tables.

11. The method according to claim 10 wherein scrubbing can take place in the background and between handling requests of the tables, and can be suspended and resumed at any time so as to not impact request service times of the tables.

12. A computer system, comprising a storage system and microprocessors, and including a cache array having an array of hierarchy storage elements containing hierarchical tables of entries of values, said hierarchy having a higher-level table and at least one lower-level table of entries, and linking multiple entries in a lower-level table to single entries in a higher-level table with a buffer having index values for said entries to maintain coherency of the entries in said hierarchical tables, said index values including a current index, a dirty index and a clean index, and said computer system incrementing an index value each time a higher-level entry is replaced or invalidated.

13. The computer system of claim 12 wherein multiples sets of index values are maintained in said array, and when one set is exhausted, processing continues with one of the other of the multiple sets.

14. The computer system of claim 13 wherein multiple entries are linked in said array in lower level tables to single entries in a higher level table with a buffered index such that having higher-level entries can share information common to all of their corresponding lower-level entries.

15. The computer system according to claim 14 wherein said index sets allow corresponding lower level entries with index values from an old/dirty set to be scrubbed/invalidated while new entries are built from a new set.

16. The computer system according to claim 15 wherein should a new request of the tables be forthcoming, the scrubbing/invalidation occurs as a background invalidation.

17. The method according to claim 16 wherein background invalidation occurs after suspending a scrubbing/invalidation of a child entry should a new request of the array be forthcoming, and wherein the scrubbing/invalidation resumes after the request is satisfied of the child entries.

18. The computer system according to claim 14 wherein cache array entries are linked using linking of multiple entries in the lower-level tables to single entries in a higher-level table with said index values in said buffer, said index values increment each time a higher-level entry is replaced or invalidated and disassociated with a set of index values of its corresponding lower-level entries, and when one set is exhausted, processing can continue with one of the other sets, wherein all corresponding lower-level entries with index values from an old dirty set can then be scrubbed/invalidated while new entries are built from a new clean set, said scrubbing preventing associating old entries in the lower-level tables with new entries in the higher-level tables.

19. The computer system according to claim 18 wherein scrubbing can take place in the background and between handling requests of the tables, and can be suspended and resumed at any time so as to not impact request service times of the tables.

20. The computer system according to claim 12, wherein said cache array has a buffer for index set management, said index sets including sets:
   a. a current index set denoting that it is one currently being used by a higher-level entry,
   b. a dirty index set denoting that it is one that is not in use and may have associated with it entries in a lower-level that have their valid bits set, and
   c. a clean index set denoting one that is not in use and does not have associated with it any entries in a lower-level that have their valid bits set.

* * * * *